United States Patent [19]
Tsur

[11] Patent Number: 5,274,963
[45] Date of Patent: Jan. 4, 1994

[54] FLUSH-MOUNT SINK ASSEMBLY METHOD

[75] Inventor: Yuval Tsur, Ashrat, Israel

[73] Assignee: Moshav Shitu Fi Regba, Ashrat, Israel

[21] Appl. No.: 851,554

[22] Filed: Mar. 10, 1992

[30] Foreign Application Priority Data

Mar. 11, 1991 [IL] Israel .......................................... 97506

[51] Int. Cl.$^5$ .............................................. B24B 7/22
[52] U.S. Cl. ............................ 51/283 E; 51/283 R; 51/100 R; 51/241 G
[58] Field of Search ............ 51/283; 125/1, 12, 11.06, 125/11.15; 83/56

[56] References Cited

U.S. PATENT DOCUMENTS 3,813,818  6/1974  Hayashi et al. ................... 51/100 R
4,992,011  2/1991  Cesark .................................. 409/126

FOREIGN PATENT DOCUMENTS 3632236  4/1988  Fed. Rep. of Germany .
 768845  8/1934  France .
2461781  2/1981  France .

Primary Examiner—Bruce M. Kisliuk
Assistant Examiner—Eileen Morgan
Attorney, Agent, or Firm—Helfgott & Karas

[57] ABSTRACT

The flush-fit mounting of an accessory such as a sink or bowl in a surface of hard material such as granite or marble can be achieved by a method comprising the steps of:

forming an opening in the mounting surface for seating the accessory within the perimeter of the edges of the opening;

supporting, in proximity to the opening, a guide means having the contour of a mounting edge of the accessory, cutting, using cutting, means movable in relation to the guide means, the edges of the opening to provide a bevelled edge suitable for mounting the accessory edge in flush-fit fashion; and adjusting the cutting means in relation to the guide means as necessary, during the cutting step, so as to maintain the cutting means sharp while maintaining uniformity for the bevelled edge over the perimeter of the opening.

6 Claims, 5 Drawing Sheets

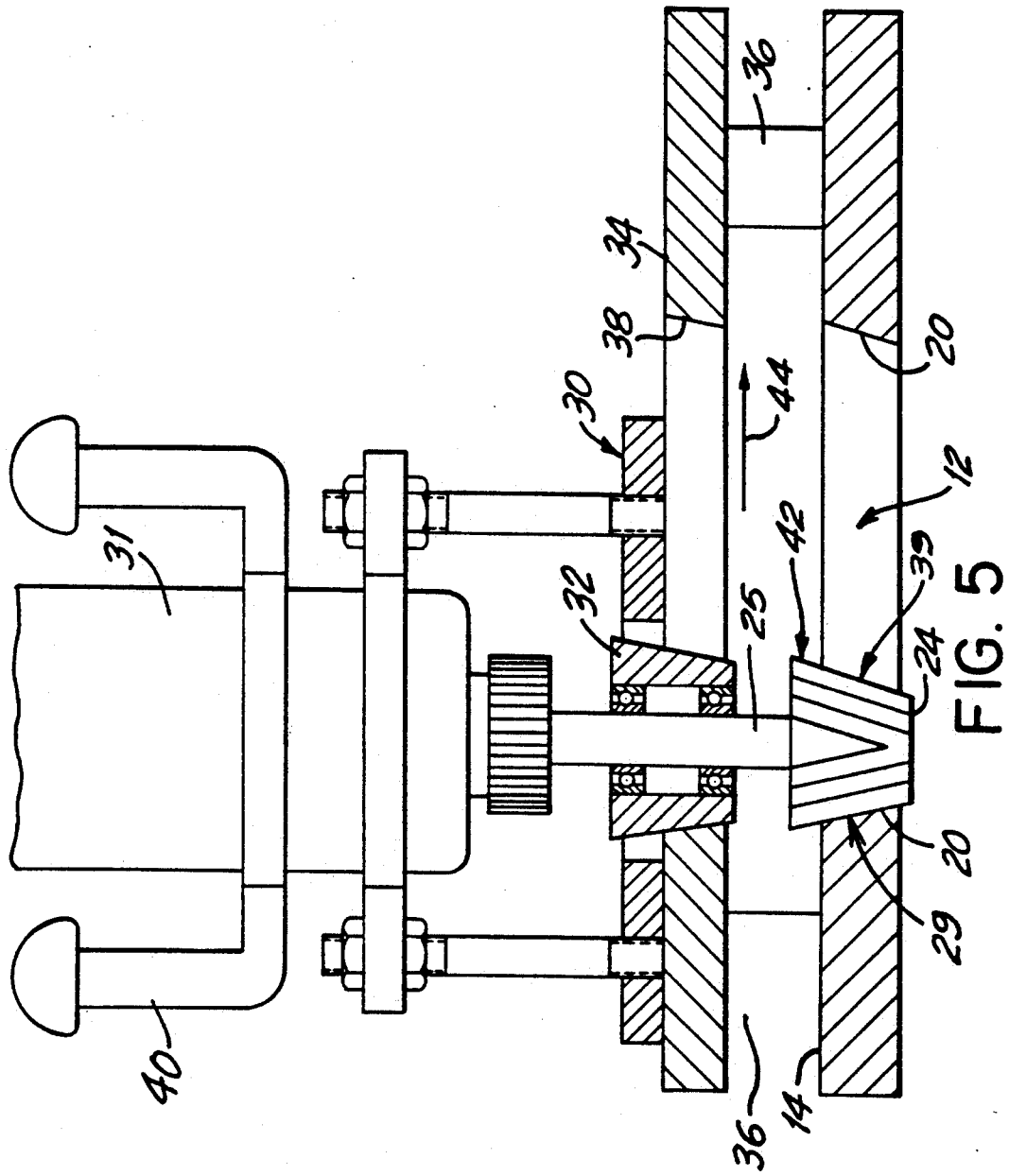

FLUSH-MOUNT SINK ASSEMBLY METHOD

FIELD OF THE INVENTION

This invention relates to sink and bowl mounting and assembly methods in kitchen and furniture cabinets and the like, and is concerned with a flush-mount sink assembly method for mounting a sink or bowl in a granite or marble surface.

BACKGROUND OF THE INVENTION

The prior art of assembly methods for mounting a sink unit or bowl in a kitchen cabinet or on a kitchen work surface includes techniques wherein the bowl is fitted for seating within a cutout opening of the mounting surface, and a sealing material is used to prevent the leakage of water through the gap formed therebetween. The bowl may be seated such that its edges are above the mounting surface, or an aluminum or other metal frame may be applied to the perimeter of the bowl edge, in an attempt to make a flush-fit connection between the two surfaces.

Alternatively, the bowl may be mounted underneath the mounting surface, and held in place by mounting hardware, with a sealing material applied to the gap. An inherent disadvantage of these constructions is that water, dirt and contamination accumulate in the sealed gap, creating an unsightly appearance and health risks due to the possibility of bacterial growth.

Prior art patents disclosing mounting assembly methods as described above include European Patent EP 0 169 981 B1, which discloses use of a profiled frame for flush-mount of a sink unit with a table top. German Patent 2,900,833 discloses use of a sealing material around the bowl edge for closing the gap with a mounting surface. German Patent 2,902,194 discloses use of a profiled frame around a sink unit for closing the gap. French Patent 8,015,221 discloses use of a sealing material for closing the gap with a mounting surface.

Another sink mounting assembly method is to mold a single surface which already includes the sink in it, from various plastic or polyester materials, for specific dimensions.

Still another prior art mounting technique is applicable to certain sink mounting surface materials marketed and available from DuPont under the tradename "Corian". This is a plastic-type mounting surface material which can be easily machined with a router, enabling the production of a bevelled edge in the cutout opening for achieving a flush-fit of a sink with the mounting surface. A problem with this approach is the use of a special glue to seal the edges of the sink. The glue causes the mounting surface and sink to become a single unit, which cannot be separated again, so that if it is necessary to remove and replace the sink, the mounting surface must be destroyed.

Production of a bevelled edge, while easily achieved with the "Corian" plastic-type mounting surface material, is very difficult to achieve with hard mounting surfaces, such as granite or marble. The latter are popular in kitchens for their hardness and durability, and because they are impervious to water. Typically, due to their hardness, the mounting approach using these materials is to use a standard cutout opening, with the sink edge placed over or under the cutout opening, and sealed thereto with appropriate sealing materials. The difficulty in cutting a bevelled edge in granite or marble mounting surfaces would preclude the flush-mount mounting approach possible with "Corian" plastic-type materials.

It is believed that workmen of ordinary skill in the art of granite and marble cutting have not applied the bevelled edge sink mounting technique used with "Corian" materials, due to the extreme difficulty encountered in making an exact cut in these materials for the entire contour of the cutout opening with the necessary accuracy and uniformity to allow for a flush-fit.

However, it would be desirable to adopt the bevelled edge sink mounting technique to granite or marble surfaces, since this would enhance the aesthetic appeal of kitchen designs, without sacrificing the benefits of these mounting surfaces.

SUMMARY OF THE INVENTION

According to the present invention, there is provided a method of preparing a mounting surface of hard material such as granite, marble and the like, for flush-fit mounting of an accessory therein, said method comprising the steps of:

forming an opening in the mounting surface for seating the accessory within the perimeter of the edges of said opening;

supporting, in proximity to said opening, a guide means having the contour of a mounting edge of said accessory, cutting, using cutting means movable in relation to said guide means, said edges of said opening to provide therein a bevelled edge suitable for mounting said accessory edge therein in flush-fit fashion; and adjusting said cutting means in relation to said guide means as necessary, during said cutting step, so as to maintain said cutting means sharp while maintaining uniformity of said bevelled edge over said perimeter of said opening.

In the method of the invention, an opening, generally having a substantially flat edge, is formed in a granite or marble mounting surface for the accessory. The edges of the opening are then prepared by cutting in accordance with the contour of a template conforming to the contour of the accessory to be mounted, such as a kitchen sink unit or bowl. The cutting means may be a diamond cutting head mounted on the rotor of a drill or router tool. During the cutting step, the movement of the cutting head is guided by the contour of the template, and by proper adjustment of the cutting head, a bevelled edge is provided in the cutout opening. The bevelled edge is pre-designed to match the mounting edges of the accessory. Thus, the accessory may be mounted in the cutout opening in a flush-fit fashion.

The template which guides the movement of the cutting head can itself be machined using computer numerical control (CNC) manufacturing techniques, to provide the exact contour for the bevelled edge. One of the problems in achieving the desired uniformity over the entire contour of the cutout is that the diamond cutting head is worn severely against the hard granite or marble mounting surface. Normally, the diamond cutting head would have to be replaced in the middle of the cutting process, introducing an uneven contour in the bevelled edge.

In accordance with the inventive method, a mechanical arrangement is provided for guiding the depth of the cutting head. Thus, a new, unused portion of the cutting head may be moved vertically into the cut. Since the cutting head is conically-shaped, the unused portion has a width greater than that of the portion initially used, and the mechanical guide provides automatic adjustment to compensate for this additional width, thus preserving the overall contour of the bevelled edge.

An advantage of the inventive method is the ability to achieve precision in the bevelled edge, despite the hardness of the mounting surfaces, thereby ensuring the necessary accuracy of the flush-fit, and eliminating gaps. This precision makes the method feasible for application to many different accessories, such as kitchen sinks, bowls, and stovetop burners.

BRIEF DESCRIPTION OF THE DRAWINGS

For a better understanding of the invention and to show how the same may be carried into effect, reference will now be made, by way of example, to the accompanying drawings, in which like numerals designate corresponding elements or sections throughout, and in which:

FIG. 5 shows an edge view of the mounting surface, with a side view of a cutting head arranged to cut the bevelled mounting edge.

DETAILED DESCRIPTION OF A PREFERRED EMBODIMENT

Figure 1:
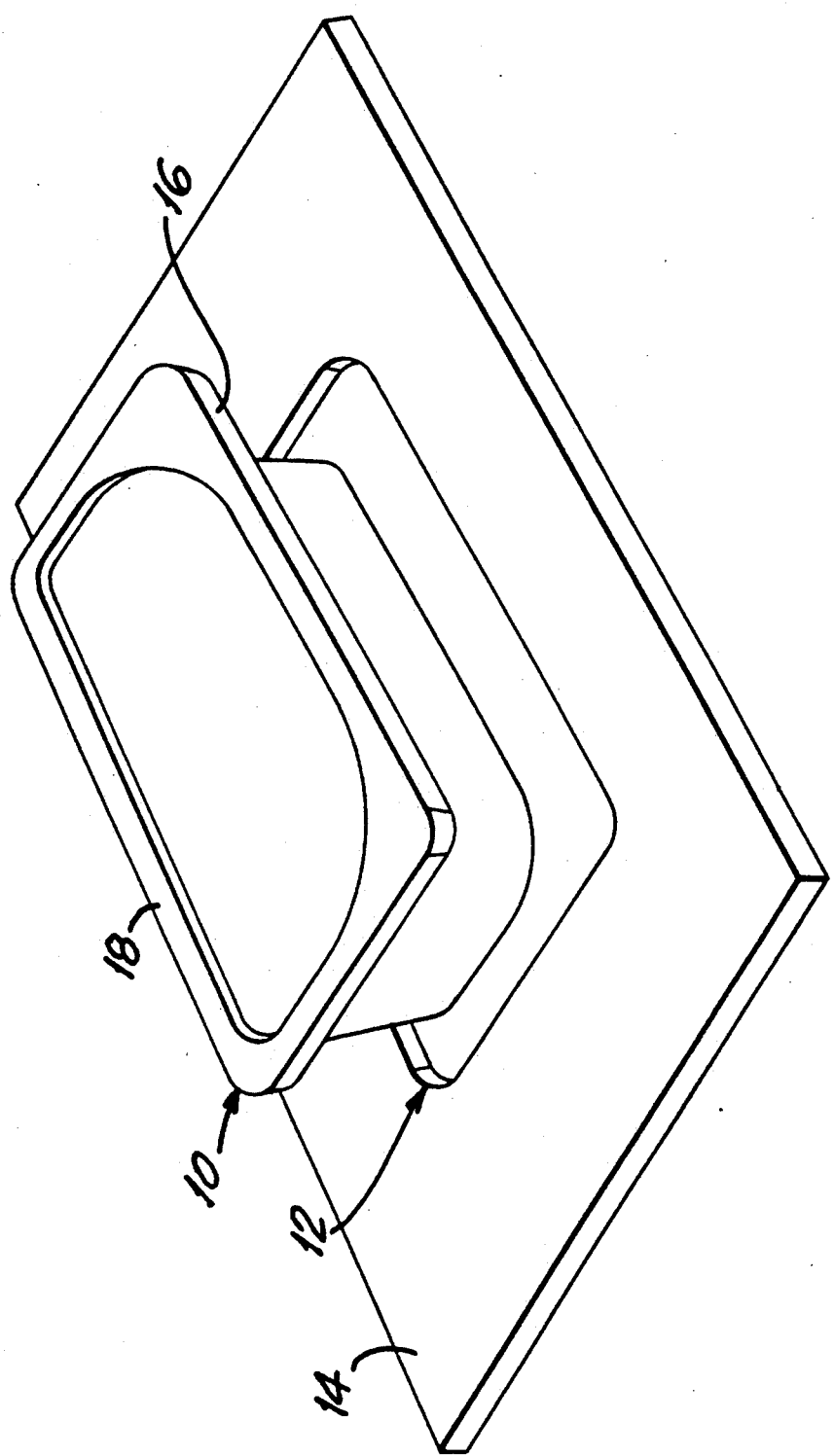
FIG. 1 is a perspective view of a sink unit arranged for flush-fit mounting within a cutout opening in a hard mounting surface, which has been prepared in accordance with the method of the present invention.

Referring now to FIG. 1, there is shown a perspective view of a sink unit 10 arranged for flush-fit mounting within a cutout opening 12 in a hard mounting surface 14, which has been prepared in accordance with the method of the present invention. As described herein, sink unit 10 is representative of various accessories which may be mounted in similar fashion, such as a bowl or a set of stovetop burners. Typically, these accessories are mounted in a mounting surface which serves multiple purposes, such as providing a work surface for preparing foods, etc.

Among the preferred materials for use as mounting surface 14 are granite and marble materials. In addition to their decorative appearance, these materials provide other advantages such as being impervious to water, while being sufficiently hard for long durability.

Typically, a cutout opening 12 is provided by cutting these hard materials with a cutting saw, providing a flat edge which is further processed to smooth rough spots. In prior art mounting methods, the edges 16 of the accessory are then mounted so as to be seated over cutout opening 12, or they are attached underneath it. Sealing materials are then applied to fill the gap between them. As described further herein, the inventive method allows edges 16 of sink 10 to be flush-fit within opening 12, so that the top surface 18 of sink 10 and mounting surface 14 are in substantially the same horizontal plane.

Figure 2:
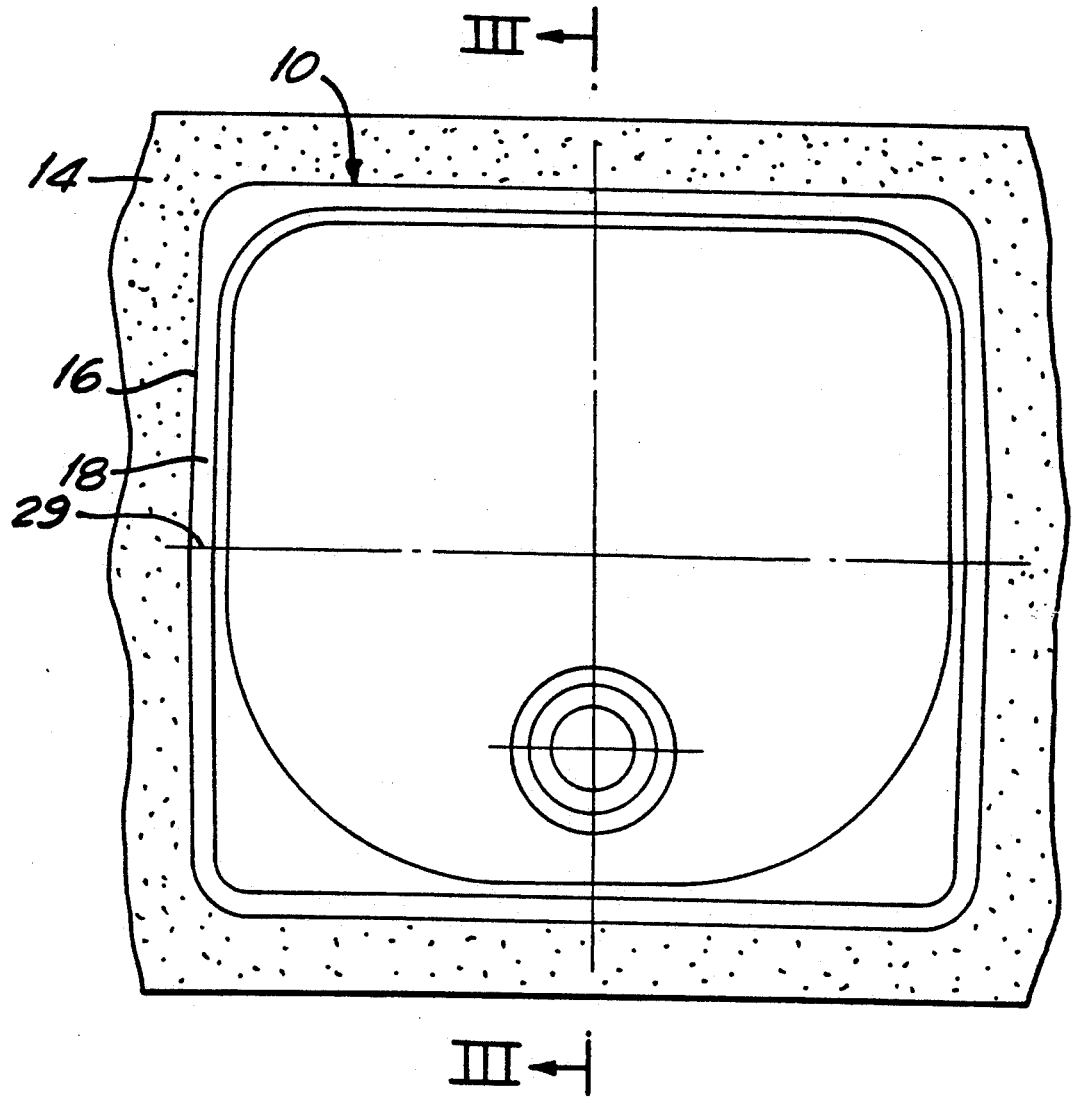
FIG. 2 is a top view of the sink unit of FIG. 1 as it appears flush-mounted in the opening in the mounting surface.

A top view of the flush-fit arrangement of sink 10 in mounting surface 14 is shown in FIG. 2. The inherent advantages of the flush-fit arrangement are many, including the elimination of gaps in sealing areas around edges 16, which would normally tend to accumulate water and dirt. In addition, the flush-fit arrangement provides an aesthetic appearance in the design of kitchen and furniture layouts, which is highly desirable.

Figure 3:
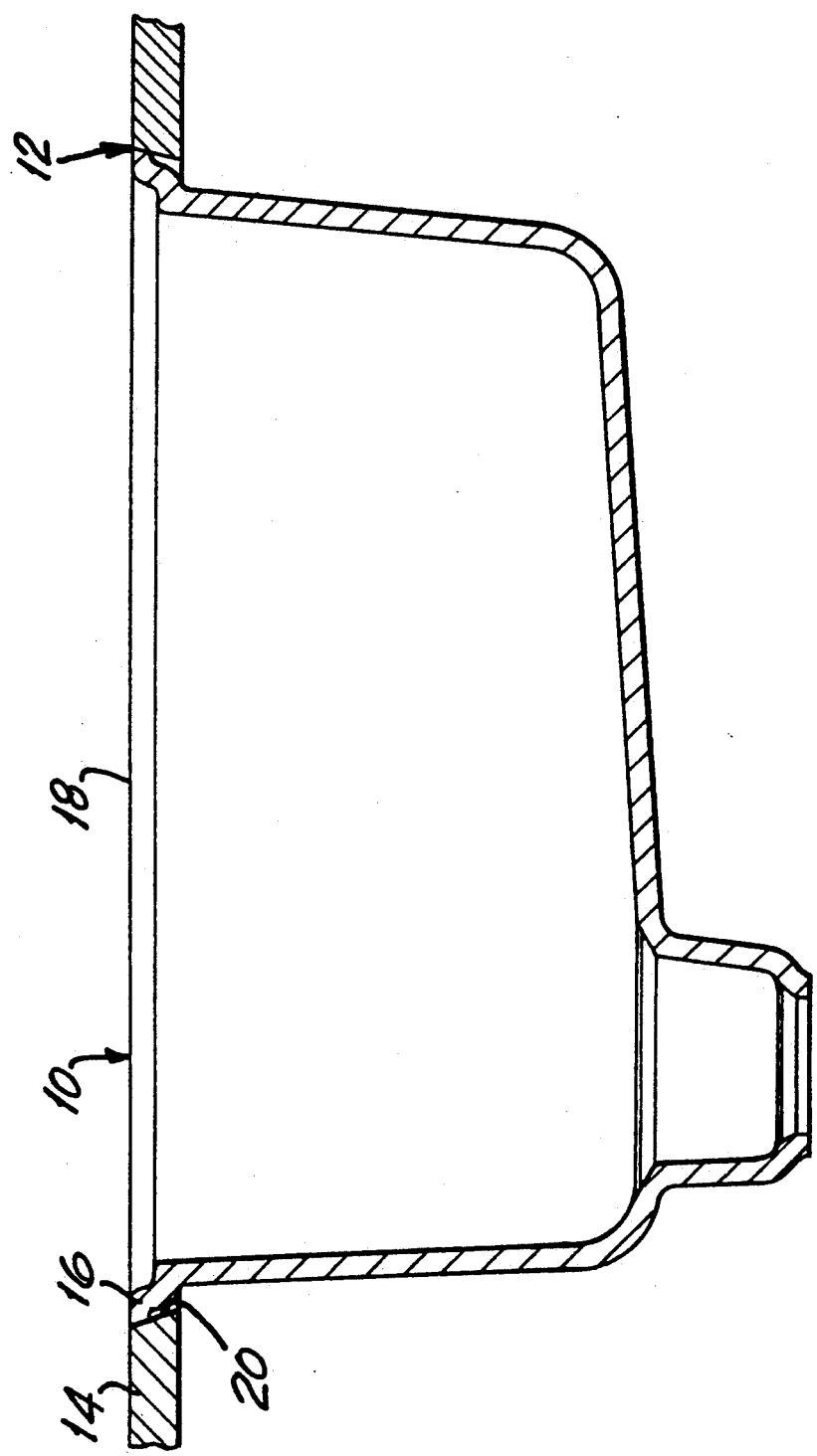
FIG. 3 is a cross-sectional view of the sink mounted within the opening of FIG. 1, taken along section lines III—III of FIG. 2.

In FIG. 3, there is shown a cross-sectional view of the sink mounted within the opening of FIG. 1, taken along section lines III—III of FIG. 2. This view shows the bevelled edges 20 formed in the mounting surface 14, against which edges 16 of sink 10 are seated in flush-fit fashion. The slope of bevelled edge 20 is designed to match the edges of sink 10 so as to ensure a flush-fit with respect to mounting surface 14. In accordance with the inventive method, bevelled edge 20 is formed after a cutting procedure in which cutout opening 12 is provided.

Figure 4:
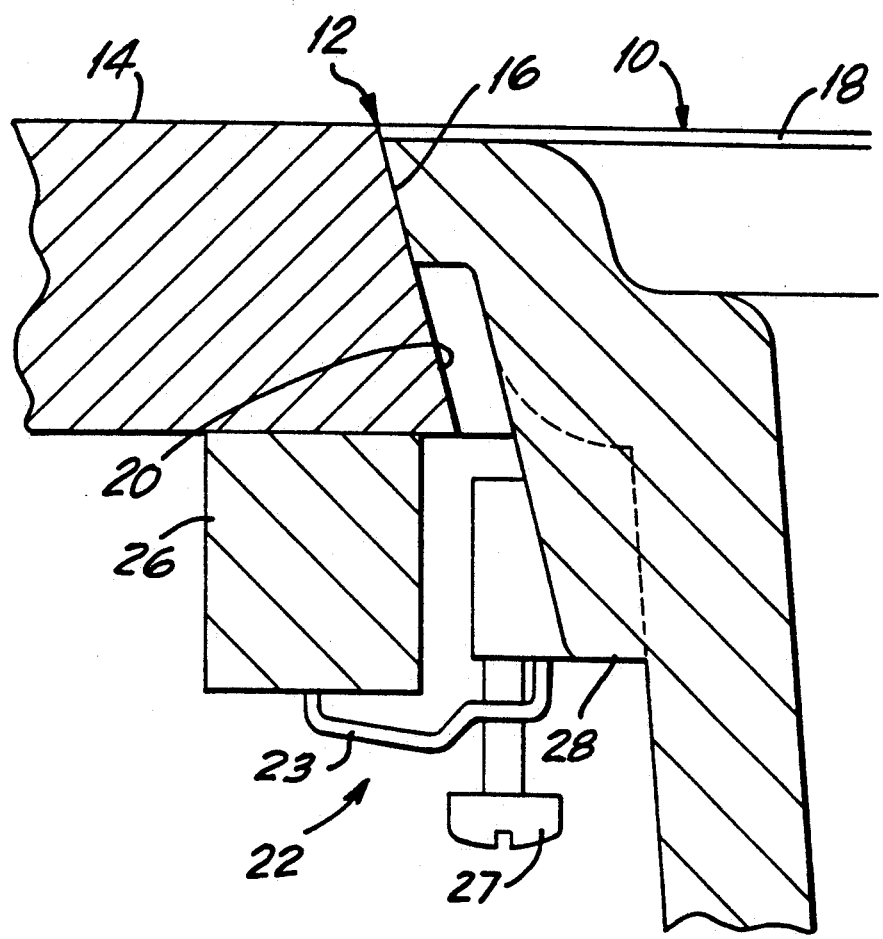
FIG. 4 is a detailed view of a portion of FIG. 3, showing the sink flush-mounted against a bevelled mounting edge.

FIG. 4 is a detailed view of a portion of the cross-sectional view of FIG. 3, revealing further construction details, including mounting hardware 22 used to secure sink 10 within cutout opening 12. Mounting hardware 22 typically comprises a bracket 23 extending between a support 26 attached to the underside of mounting surface 14, and connected via screw 27 to an anchoring point 28 which is typically molded as a protrusion on sink unit 10.

Once cutout opening 12 has been provided, formation of bevelled edge 20 proceeds in accordance with the inventive method illustrated in FIG. 5, in which a cutting head 24 is arranged to cut bevelled mounting edge 20 in the hard mounting surface 14. FIG. 5 shows an edge view of mounting surface 14 as seen in the cross-sectional view of FIG. 3, with the addition of cutting head 24 shown at a location 29, as defined in FIG. 2. In FIG. 5, unlike in FIGS. 3–4, cutout opening 12 is shown without sink unit 10 fitted therein.

Cutting head 24 is provided as a conically-shaped diamond cutting bit fitted on a rotor 25 of a routing tool 31. Router 31 is fitted within a movable frame 30 which has a guide 32 extending downwardly therefrom, through which rotor 25 passes. Guide 32 is adjustable on frame 30, so that it may be raised or lowered in height.

In accordance with the inventive method, a template 34 is provided to control the movement of cutting head 24 during formation of bevelled edge 20. Template 34 is advantageously manufactured by CNC machine tool milling techniques to match the contour of the edges 16 of sink unit 10. When used in the arrangement of FIG. 5, template 34 provides the exact dimensions to be used in formation of the bevelled edge 20 by the inventive method.

The inventive method proceeds by securing template 34 over the top of mounting surface 14, on a pair of spacers 36. Frame 30 is then seated on template 34, such that guide 32 extending downwardly therefrom is arranged so as to be in contact with an inner edge 38 of template 34. A depth gauge (not shown) is generally provided as part of router 31, and this can be used to fix the depth of the cutting head 24, so that its bottom portion 39 cuts the bevelled edge 20.

The router 31 is operated by gripping handles 40 and moving router 31 and its guide 32 against inner edge 38 of template 34 and around cutout opening 12, to rout bevelled edge 20 in accordance with the conical shape of cutting head 24. Thus, the angle of the bevelled edge 20 is determined, and this angle may be modified by adjustment of the seating of frame 30 on template 34.

During the motion of frame 30 along template 34, the contour of bevelled edge 20 is formed over the perimeter of cutout opening 12. The contour of bevelled edge 20 must be smooth and uniform to ensure a flush-fit with the edges 16 of sink unit 10.

Due to the hardness of the granite or marble material, which typically has a Rockwell hardness of 60–70, a problem is encountered with cutting head 24, since it is severely worn in a short time. Normally, router 31 is removed from the cutout opening 12, allowing access to rotor 25 for changing the cutting head 24. Since a high level of precision of the bevelled edge 20 is required, it would be inconvenient to interrupt the router 31 and remove it. If this is done, it may very well adversely affect the result of the procedure, especially the edge 20 uniformity.

Therefore, in accordance with the inventive method, the need to remove router 31 from cutout opening 12 is eliminated, since the upper portion 42 of cutting head 24 may be used to continue the cutting procedure. For this purpose, the router 31 operation is interrupted, and its depth gauge is reset to lower cutting head 24 so that its upper portion 42 is moved into position against the edge being cut. Since it is conically shaped, upper portion 42 of cutting head 24 has a larger circumference, which would adversely affect the uniformity of bevelled edge 20 upon adjustment of the depth of cutting head 24.

To compensate for the cutting head 24 depth adjustment, guide 32 is also conically-shaped to offset the larger circumference of upper portion 42 of cutting head 24. Thus, as cutting head 24 is lowered, guide 32 causes rotor 25 to move away from bevelled edge 20 in the direction of arrow 44, so that the overall shape of bevelled edge 20 is preserved when upper portion 42 contacts the edge being cut. This technique ensures the necessary precision of bevelled edge 20 without significant disturbance to the cutting procedure.

Once the cutting procedure has been completed for the entire contour of cutout opening 12, bevelled edge 20 has a uniform shape, and sink unit 10 can be mounted therein in flush-fit fashion as shown in FIGS. 2–4.

What I claim is:

1. A method of preparing a mounting surface of hard material such as granite or marble for flush-fit mounting of an accessory therein, said method comprising the steps of:

forming an opening in the mounting surface for seating the accessory within the perimeter of the edges of said opening;

providing a guide means having the contour of a mounting edge of said accessory and supporting said guide means in proximity of said opening;

cutting, using cutting means movable in relation to said guide means, said edges of said opening to produce therein a bevelled edge for mounting said accessory edge therein so as to ensure a flush-fit of said mounting edge of said accessory in said opening; and adjusting said cutting means in relation to said guide means as necessary, during said cutting step, so as to maintain said cutting means sharp while maintaining uniformity of said bevelled edge over said perimeter of said opening.

2. A method according to claim 1, wherein during said forming step, a substantially flat edge is provided in said opening.

3. A method according to claim 1, wherein said guide means is supported over said opening by a set of spacers which maintain fixed spacing of said guide means over said mounting surface.

4. A method according to claim 1, wherein said cutting means comprises a router tool having mounted on a rotor thereof a conically-shaped cutting head in contact along a first portion thereof with said edges of said opening, and wherein said adjusting step is performed during said cutting step by adjusting said cutting head such that it is in contact along a second portion thereof with said edges of said opening, said second portion being larger than said first portion by an addition to its circumference, said guide means compensating for said larger circumference to maintain said bevelled edge uniformity.

5. A method according to claim 4, wherein said guide means is conically-shaped to provide said compensation for said larger circumference of said cutting head.

6. A method according to claim 1, wherein said bevelled edge has a slope which matches the edges of the accessory so as to ensure a flush-fit with respect to said mounting surface.

* * * * *